Oct. 30, 1934.    O. A. MILAM ET AL    1,978,808
MACHINE FOR SAWING NUTS AND THE LIKE
Filed Sept. 17, 1931    7 Sheets-Sheet 1

Fig.1

Inventors
Oran A. Milam
Robert E. Milam
By 
Attorney

Oct. 30, 1934.  O. A. MILAM ET AL  1,978,808
MACHINE FOR SAWING NUTS AND THE LIKE
Filed Sept. 17, 1931  7 Sheets-Sheet 2

Inventors:
Oran A. Milam
Robert E. Milam
By Jack A. Schley, Attorney

Oct. 30, 1934.     O. A. MILAM ET AL     1,978,808
MACHINE FOR SAWING NUTS AND THE LIKE
Filed Sept. 17, 1931     7 Sheets-Sheet 3

Fig. 3

Inventors
Oren A. Milam
Robert E. Milam

By 
Attorney

Oct. 30, 1934.  O. A. MILAM ET AL  1,978,808
MACHINE FOR SAWING NUTS AND THE LIKE
Filed Sept. 17, 1931  7 Sheets-Sheet 4

Inventor
Oran A. Milam
Robert E. Milam

By Jack A Schley
Attorney

Inventors
Oran A. Milam
Robert E. Milam
By Jack A. Schley
Attorney

Patented Oct. 30, 1934

1,978,808

UNITED STATES PATENT OFFICE 1,978,808

MACHINE FOR SAWING NUTS AND THE LIKE

Oran A. Milam and Robert E. Milam, Brownwood, Tex., assignors of one-third to Douglas Coalson, Brownwood, Tex.

Application September 17, 1931, Serial No. 563,324

14 Claims. (Cl. 146—10)

This invention relates to new and useful improvements in machines for sawing nuts and the like.

One object of the invention is to provide an improved machine for sawing kerfs in the shells of nuts, and particularly small nuts such as pecans, walnuts and the like.

A particular object of the invention is to provide a machine having means for sawing a maximum number of nuts in a given period of time, whereby the sawing may be accomplished at a minimum expense.

A further object of the invention is to provide a self-adjusting support which will readily accommodate itself to different sizes and shapes of nuts, and hold each in position to be effectively acted upon by the saws.

Still another object is to provide means for holding each nut as well as centering each nut immediately above the saws in position to be forced down between said saws by a moving element of the machine.

Another object of the invention is to provide yieldably mounted saws co-acting with the self-adjusting nut support, whereby the shell of each nut is longitudinally sawed, together with gauges for regulating the depth to which the saws cut into the shells of the nuts so as to save the meats from damage.

A still further object of the invention is to provide a nut gripping device co-acting with the saws and an unobstructed discharge below the gripping device so that after a nut is once sawed it may be expeditiously discharged from the device thereby permitting the succeeding nut to be immediately placed in position without loss of time and without waiting for moving instrumentalities to clear the paths of the nuts.

A further object of the invention is to provide an improved feeding means which assures a positive feed of the nuts, one by one, and in proper position to be handled.

Another object of the invention is to provide a clutch mechanism for the feed driving means so arranged as to automatically interrupt the transmission of power when any moving part of the feed mechanism is obstructed; and also arranged to be mounted on a drive shaft which may be used in common with other machines.

A further object of the invention is to provide means for feeding elongated nuts each longitudinally into the path of the nut pusher, whereby such nuts will be correctly positioned for feeding to the saws.

A still further object of the invention is to provide means co-acting with the nut support for centering and vertically aligning each nut prior to its entrance between the saws.

Another object of the invention is to provide a fly wheel for each saw spindle, whereby sufficient momentum is maintained to offset the retarding shock incidental to the saws engaging a nut, thereby assuring continuous and maximum sawing efficiency.

A construction designed to carry out the invention will be hereinafter described together with other features of the invention.

The invention will be more readily understood from a reading of the following specification and by reference to the accompanying drawings in which an example of the invention is shown, and wherein.

In the drawings, the numeral 10 designates a base plate which is used for convenience, but it is to be understood that unattached parts could be mounted on separate bases. A table 11 is carried by legs or standards 12 secured upon the base plate.

Figures 2, 19, 20:
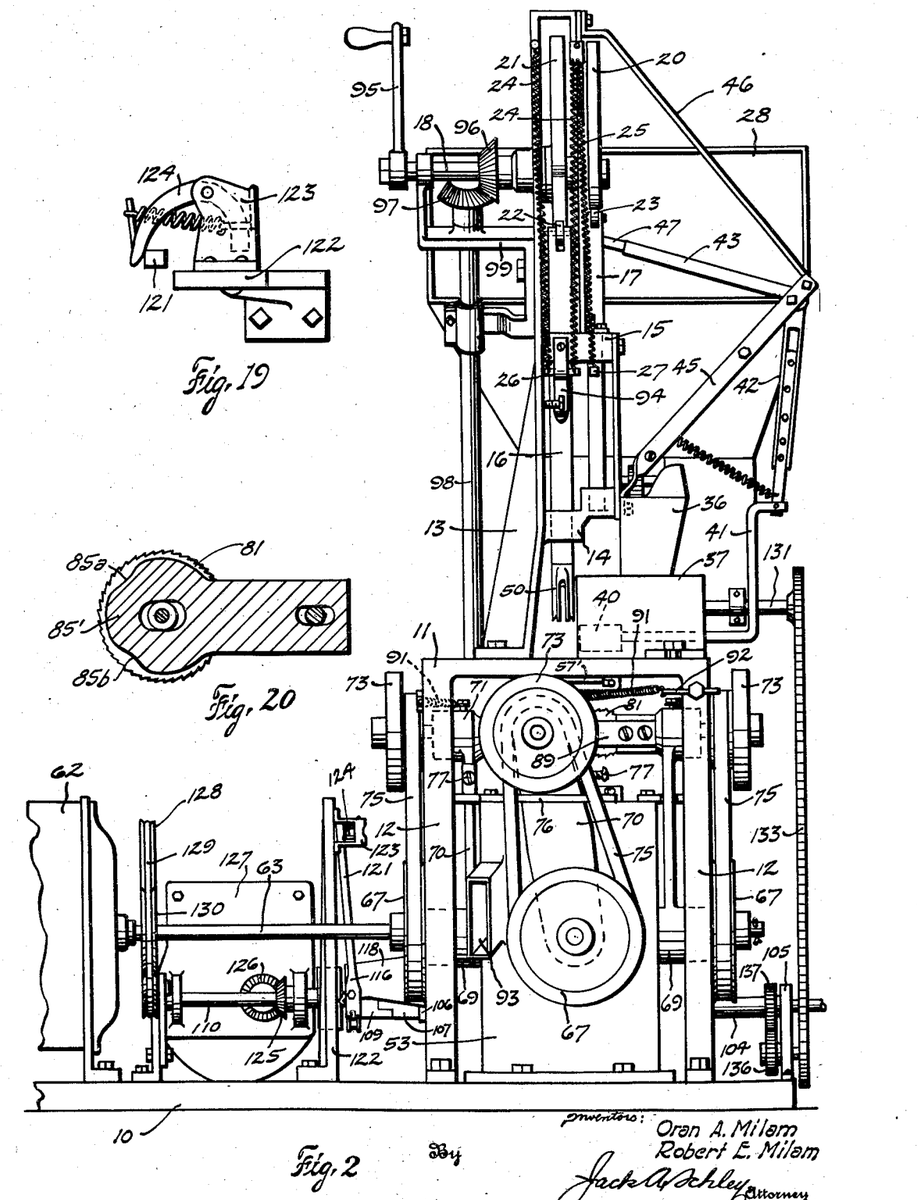
Figure 2 is a front or side elevation of the same.
Figure 19 is a plan view of the clutch holding hook.
Figure 20 is a detail of the modified form of saw gauge ring.
Figure 3:
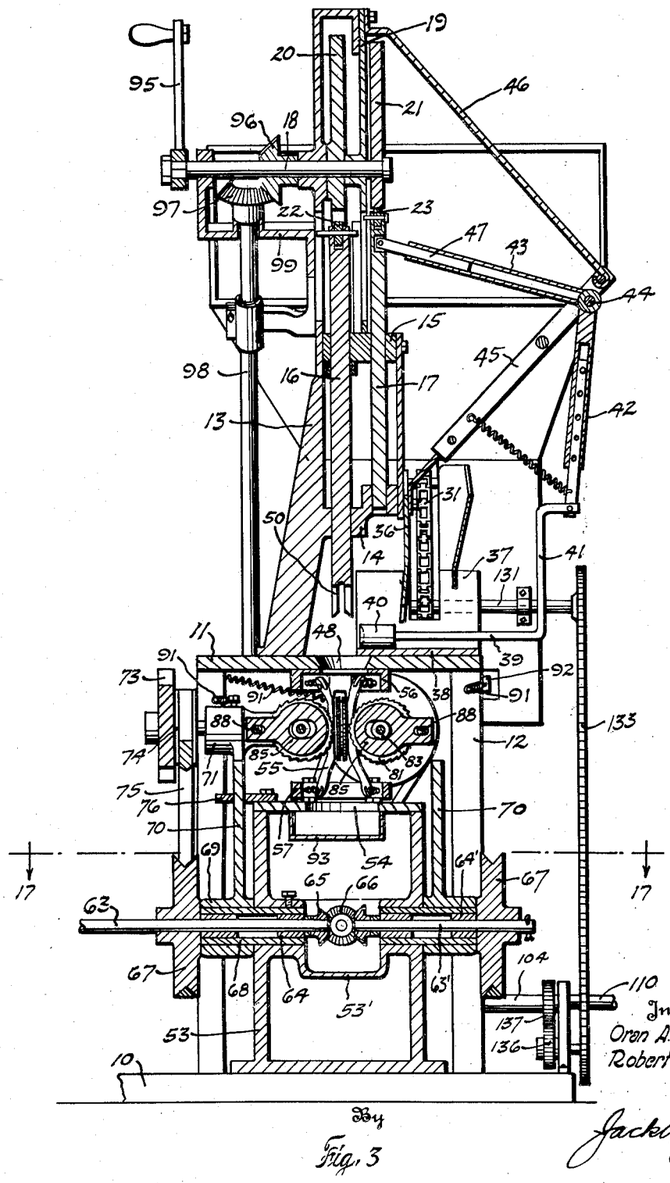
Figure 3 is a transverse vertical sectional view taken on the line 3—3 of Figure 1.

An upright frame 13 is secured upon the table, and this frame is provided with guide arms 14 and 15 (Figures 2 and 3). A vertically reciprocating pusher bar 16 is mounted to slide in said arms and a vertically reciprocating slide bar 17 is also mounted in said arms. A countershaft 18 is journaled in a head 19 mounted at the upper end of the frame, and has fastened thereon a cam 20 and a cam 21.

The cam 20 is mounted directly over bar 16 while the cam 21 is mounted directly over the bar 17. A roller 22 (Fig. 2) journaled in the top of the bar 16 engages the cam 20, while a roller 23 journaled in the top of the bar 17 rides against the cam 21. It is obvious that as the shaft 18 is rotated the cams will depress the bars 16 and 17. For returning said bars and holding them in contact with the cams, we suspend a pair of coil springs 24 and a single coil spring 25 from the head 19. The lower ends of the springs 24 are connected to a cross bar 26 on the bar 16 as is best shown in Figure 2. The lower end of the spring 25 is connected to a stud 27 mounted on the bar 17 as is best shown in Figures 1 and 2.

Figure 1:
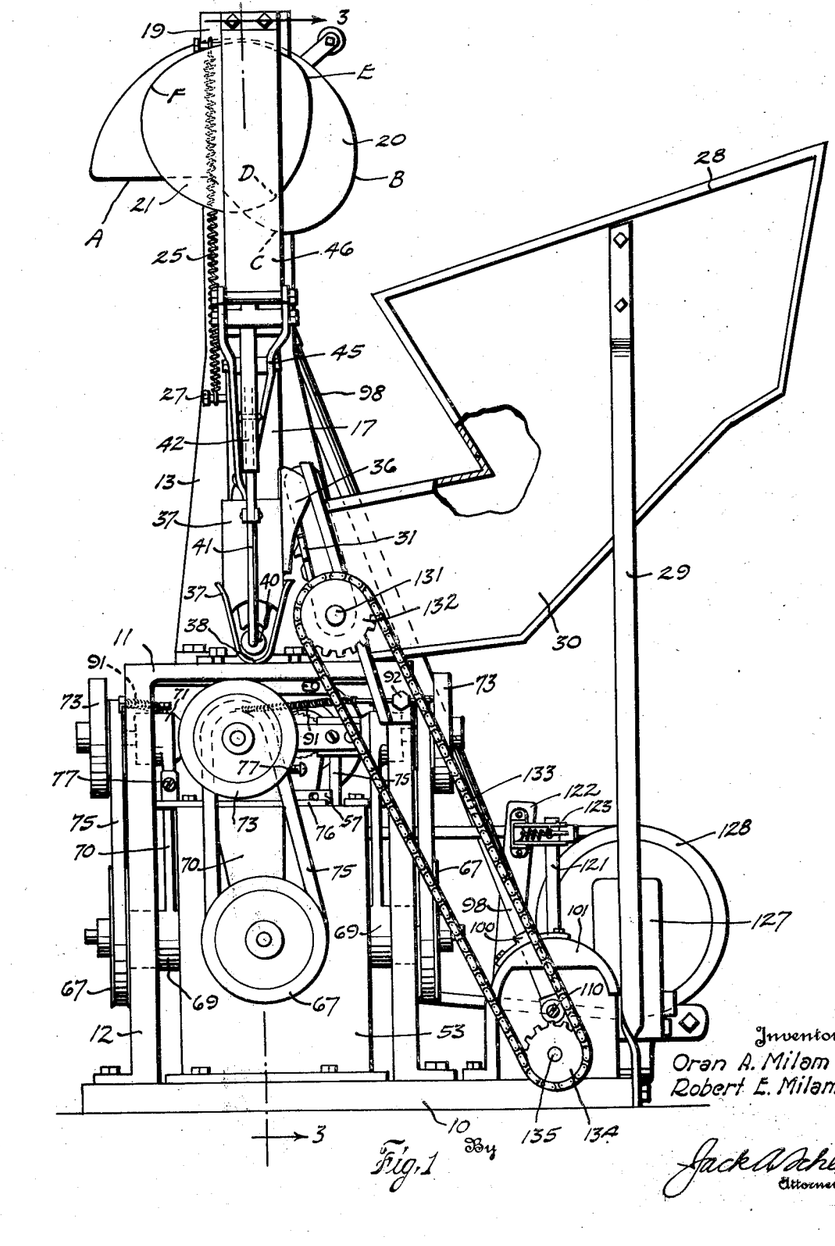
Figure 1 is an end elevation of a machine constructed in accordance with the invention.
Figure 13:
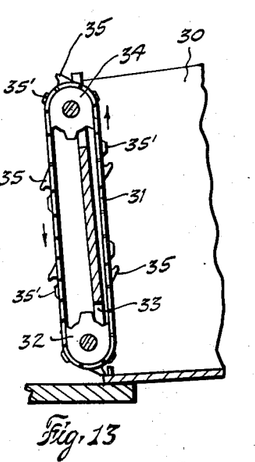
Figure 13 is a sectional view of the nut elevator.
Figure 14:
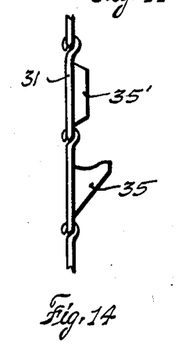
Figures 14 and 15 are details of the elevator chain.
Figure 15:
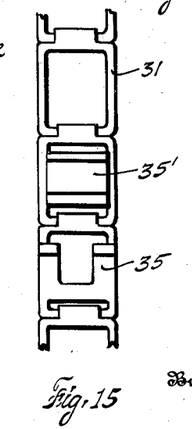

A hopper 28 is suitably supported at the upper end of standards 29 secured to the base 10 as is shown in Figure 1. This hopper discharges into an inclined chute 30 having its lower end resting upon the table 11. An elevator comprising an endless chain 31 is mounted at one end of the chute as is shown in Figures 1, 3 and 13. The chain passes around a lower sprocket 32 through a slot 33 in the end of the chute and travels upwardly within said chute. The upwardly moving chain passes outwardly over a sprocket 34 at the top of the chute. The upper sprocket slightly overhangs the lower sprocket so that individual nuts carried by the buckets 35 will be cast outwardly and downwardly when the buckets pass over the center of the upper sprocket. The elevator is so arranged as to discharge the nuts one by one into a spout 36 which is shown in Figures 1, 2 and 3, and which in turn discharges the nuts into a V-shaped trough 37. This trough has its bottom 38 rounded in cross-section and each nut is delivered so that its longitudinal axis is disposed longitudinally of the trough.

For discharging the nuts from the trough, we provide a plunger 39 which is best shown in Figure 3. This plunger is provided with a head 40 and is arranged to reciprocate longitudinally of the trough 37. The plunger has an upstanding angular arm 41 at its outer end. The telescoping arm 42 of a bell crank lever 43 has its lower end pivoted to the upper end of the arm 41. The lever 43 is journaled on a shaft 44 in an inclined yoke 45 (Figures 1, 2 and 3), which has its lower end supported by the frame arm 14. The upper end of the inclined yoke is supported by a brace 46 secured to the head 19 of the frame.

An angular finger 47 pivoted in the slide bar 17 (Fig. 3) near its upper end telescopes into the end of the lever 43. When the bar 17 is depressed the finger will swing the bell crank lever whereby the plunger will be withdrawn so that the nut discharged from the chain 31 will fall into the trough 37 in front of the plunger head 40. Upon the up stroke of the bar 17 lever 43 will be swung so as to move the plunger 39 inwardly, whereby the nut will be discharged from the inner end of said trough. By timing the parts each nut will be discharged in front of the plunger head 40 while the same is at the outer end of its stroke, and thereby a nut will be discharged from the trough upon each reciprocation of said plunger. The cam 21, which constantly bears on the roller 23, has such a shape (Fig. 1) as to depress the bar 17 once during each revolution. In Figure 3 the cam is in its uppermost position, and the plunger is in its discharging position.

Figure 11:
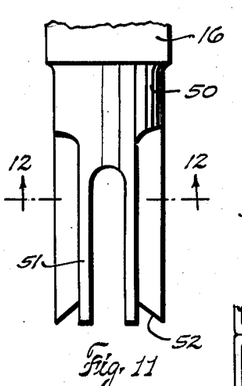
Figure 11 is a detail of the nut pusher.
Figure 12:
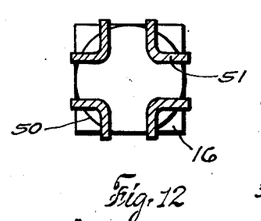
Figure 12 is a horizontal cross-sectional view taken on the line 12—12 of Figure 11.

Below the pusher bar 16 a beveled opening 48 is formed in the table 11 and the nut is discharged from the trough 37 into this opening. On the lower end of the pusher bar 16, a pusher head 50 is mounted. This head is shown in detail in Figures 11 and 12, and includes four vertical fingers 51, angular in cross section and having their lower edges 52 beveled inwardly and upwardly.

Figure 6:
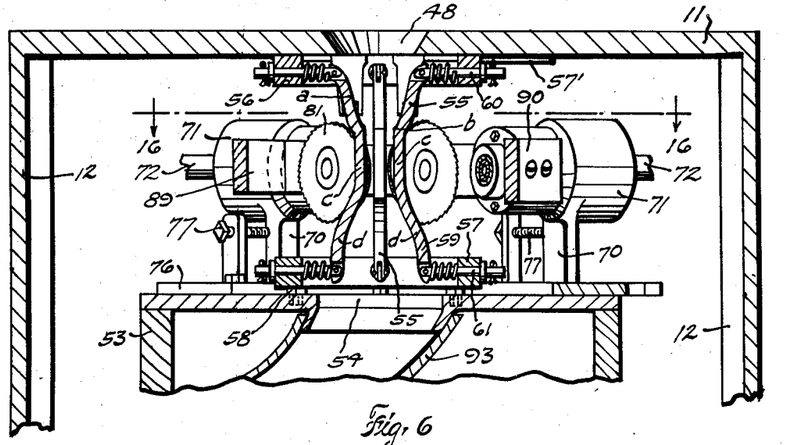
Figure 6 is a transverse vertical sectional view taken on the line 6—6 of Figure 4, the table being added.

Below the table 11 and between the legs 12, we mount on the base 10, a gear box 53 having a central opening 54 in its top axially aligned with the opening 48. A nut cage 55 is mounted on the top of the box between the openings 48 and 54 as is shown in Figs. 3 and 6. This cage includes an upper ring 56 and a lower ring 57, which is confined against lateral movement by lugs 57' on the under side of the table 11. The lower ring is suitably confined on bosses 58 (Fig. 6) while the upper ring merely engages the underside of the table 11. These rings are connected by vertical grippers 59. Each gripper has a pivotal connection at its upper end with a spring pressed plunger 60 slidable in the upper ring, and its lower end is pivotally connected with a spring pressed plunger 61 mounted in the ring 57.

Figure 16:
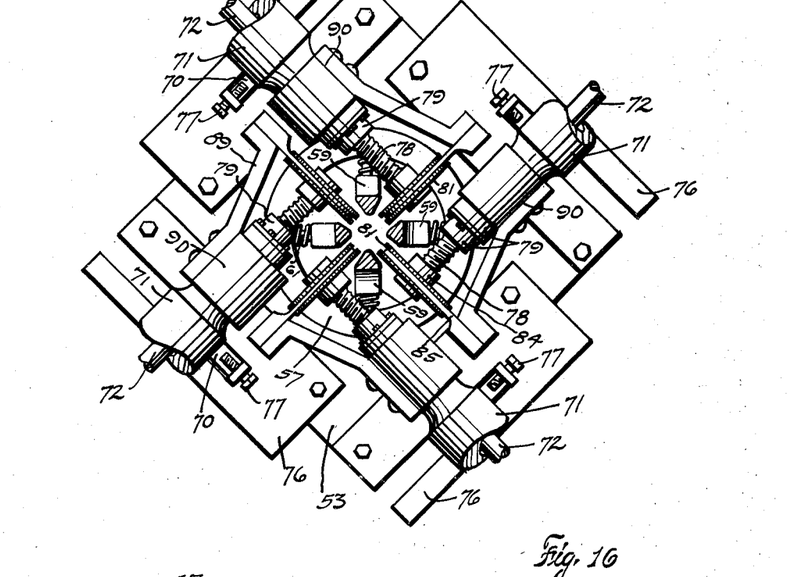
Figure 16 is a horizontal cross-sectional view taken on the line 16—16 of Figure 6.

The grippers are shown in detail in Figures 6 and 16. Each gripper includes an inclined throat portion $a$ at its upper end, at the bottom of which is formed a shoulder $b$. When the grippers are assembled it will be seen that a nut falling through the opening 48 will be received in the throat and supported on the shoulders $b$ ready to be sawed. Each gripper below its shoulder $b$ has a gripping or work holding portion $c$, while its lower portion $d$ is curved outwardly so as to provide clearance for the sawed nut. The cage formed by the grippers is a very important feature, and by reason of the spring mounting the grippers will yield, thus becoming self-adjusting and accommodating themselves to nuts of different sizes and shapes.

Figures 17, 18:
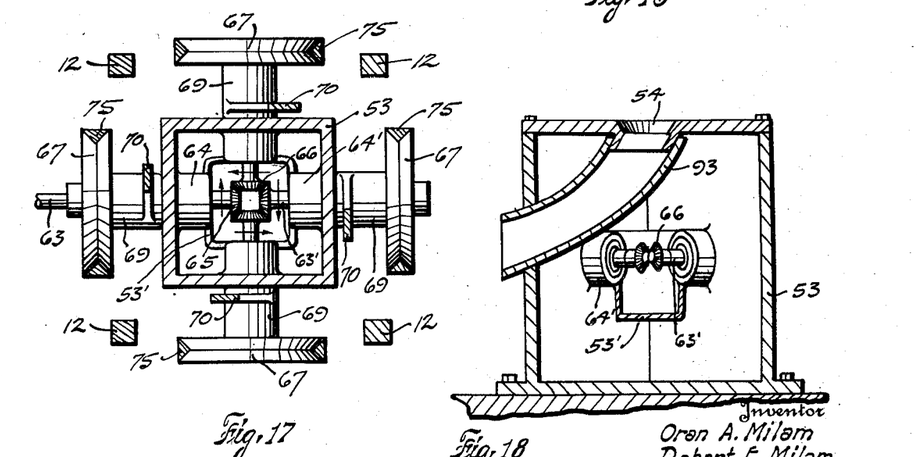
Figure 17 is a horizontal cross-sectional view taken on the line 17—17 of Figure 3.
Figure 18 is a transverse vertical view through the gear housing showing the discharge chute.

A drive shaft 63 is connected with an electric motor 62 mounted on the base 10. This drive shaft is mounted in bearings 64 in the wall of the gear box 53, and has a beveled pinion 65 fastened on its inner end. Bevel or mitre pinions 66 mesh with each other and the pinion 65, as shown in Figure 18, whereby all pinions are driven in common. The pinions 66 are mounted on countershafts 63' at right angles to each other, and supported in bearings 64' similar to the bearing 64. By this arrangement, motion is transmitted from the drive shaft 63 to the countershafts 63'.

As each of the sawing units is substantially the same, a description of one will explain the others. On each of the shafts 63' and the shaft 63 is fastened a large pulley 67 at the end of the bearing sleeve 68. The hub 69 of a supporting arm 70 is confined on the sleeve so that the arm may rock or swing in a vertical plane. At the upper end, the arm carries a head 71 in which a saw spindle 72 (Fig. 5) is suitably journaled with proper bearings to sustain the revolving of the spindle at a high rate of speed. On the outer end of the spindle, a fly-wheel 73 is fastened, and against the inner side of the fly-wheel, a small pulley 74 is secured on the spindle 72. A V-belt 75 extending from the pulley 67 to the pulley 74 drives the spindle. A slotted guard 76 (Figs. 1, 2 and 4) mounted on the box 53 receives the arm 70 and carries a set screw 77 which acts as a stop to limit the swing of the arm, as will be hereinafter explained.

Figure 5:
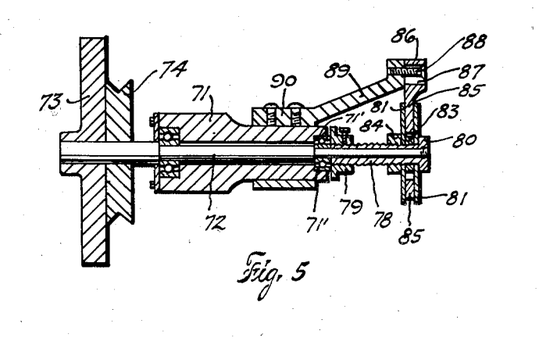
Figure 5 is a sectional view of one of the saw heads.

On each spindle 72 is mounted a screw-threaded sleeve 78 as is shown in Figure 5. This sleeve has its inner end secured in a flanged collar 79 bearing against the end of a ball bearing 71' and suitably fastened on the reduced end of the spindle. The sleeve has an integral collar 80 at its outer end and a small circular saw 81 of a pair of saws, is mounted on the sleeve against said collar. A spacer ring 83 is screwed on the sleeve for holding the saw against the collar, and the second or complementary saw 81 is held against the spacer by a lock nut 84. Each saw is provided with very fine teeth and the saws are made of extremely thin steel properly tempered, and of such material as to cut efficiently when revolving at a high rate of speed.

The saws are spaced very close together so that when four sets or eight saws in all are used, the quadrants of a small nut may be sawed with kerfs properly spaced apart. In order to control the depths of the cut so that thin shells may be sawed as well as thick shells without injuring the meats, we provide for each pair of saws a gauge ring 85 (Fig. 5) which surrounds the ring 83 with sufficient clearance therebetween to permit a lateral adjustment of the gauge ring. The gauge ring does not rotate and this is an important feature of the invention, as is also the fly-wheel 73. The fly-wheel maintains momentum so that when the saws first engage the hard shell of the nut the incidental shock will not retard the rotation of said saws. The gauge being held stationary does not need bearings, and will not tend to burnish or dislodge the shell of the nut. The gauge ring 85 is provided with an enlarged shank 86 having a slot 87 for receiving a screw 88 mounted in a bracket arm 89. By reason of the slot and the screw, the gauge may be adjusted in a horizontal plane, thereby regulating the depth of the cut. The bracket arm 89 is fastened to a collar 90 secured on the head 71.

Figure 4:
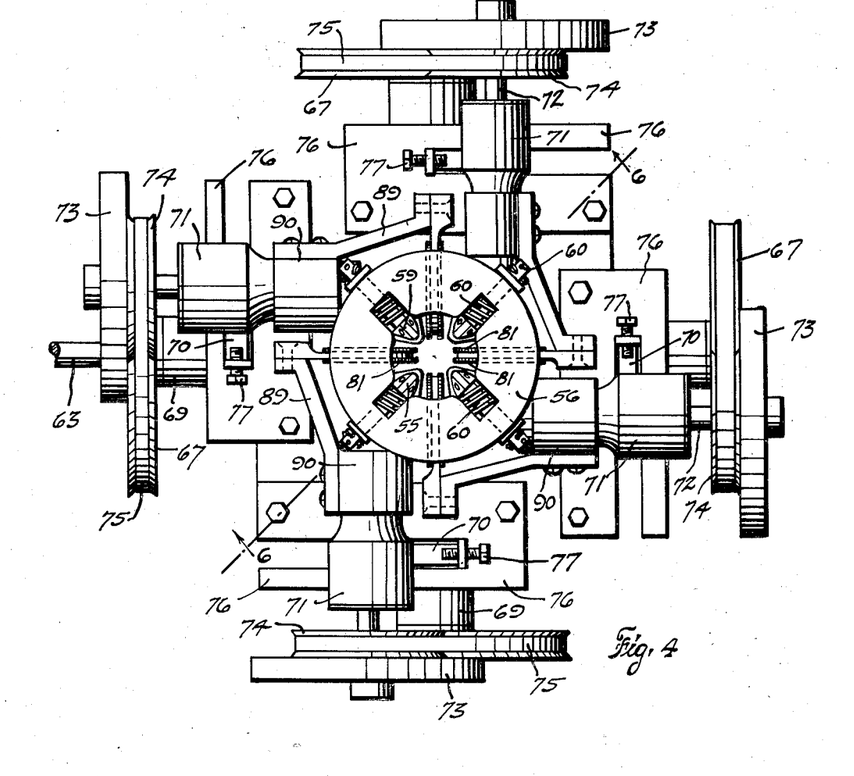
Figure 4 is an enlarged plan view of the sawing and gripping mechanism, the upper structure being omitted.

The saw mechanism is so positioned that each pair of saws is at right angles to each other pair, and each pair of saws projects between the grippers 59 as is clearly shown in Figures 4 and 16. In order to hold the saws in position each head 71 is connected with one end of a coil spring 91, which has its opposite end connected to a keeper 92 mounted on one of the table legs 12 and under sufficient tension to hold the arm 70 against the stop screw 77 as is shown in Figure 2. By this arrangement each saw unit is yieldably supported so that the saws may be displaced outwardly by the nut and have yieldable contact therewith, but are prevented from engaging each other.

From the foregoing it will be seen that a nut which has been discharged through the opening 48 in the table 11 by the plunger head 40 will be supported on the shoulders b of the grippers 59 in the throat portions a. When the pusher bar 16 (Figure 3) is moved downwardly, the inclined edges 52 (Fig. 11) of the pusher head 50 will engage the uppermost end of the nut and not only center it but tend to vertically align an elongated nut. As the bar continues its downward movement, the yieldable grippers are spread so that the nut is pushed in between the gripping portion c, and at the same time sawed by the saws 81, which, of course yield according to the size of the nut, and cut to the depth limited by the gauge ring 85. The pusher head 50 continues to push the nut through the saws, and to permit this, the angular fingers 51 receive the grippers and the saws operate between the fingers as will be evident from Figure 12. After the nut has been sawed the head 50 pushes it downward and the clearance afforded by the curved portions d of the grippers permits the nut to fall through the opening 54 in the top of the box 53. A chute 93 shown in Figures 2, 3, 6 and 18 extends through the box 53 and receives the nut from the opening 54. This chute may discharge onto a conveyor (not shown) or any other medium for handling the sawed nuts. When the nut is discharged the pusher bar 16 is retracted.

In order to properly time the movements of the plunger 39 and the pusher bar 16, the cams 20 and 21 are employed. These cams are shown in elevation in Figure 1. The cam 20 has a radial flat side A and from the outer end of this flat side, the periphery of the cam is shaped in the form of a volute curve to the point B, whereby the radius gradually reduces from the flat side A to the point B. From the point B a second volute curved surface extends to the point C but on a shorter radius, and from the point C a rather sharp decline falls away to the flat surface A.

When the bar 16 is at its uppermost or top position, the parts are substantially in the positions shown in Figure 1, 2 and 3. The cam 20 is revolved in a clock-wise direction (Fig. 1) which causes the sharp decline of the cam from the flat surface A to the point C to ride along the roller 22. This steep incline imparts a rapid downward movement to the bar 16 whereby the head 50 is quickly carried down through the opening 48. While the roller 22 is traveling on the cam surface from C to B, the pusher head 50 will engage the nut and force it into contact with the saws. As the sawing action begins, the point B passes over the roller, and the gradually increasing radius of the cam surface continues the downward movement of the bar 16, which completes the sawing action and discharges the nut. The travel from B to A is slightly slower than the preceding travel, however, the entire movement is very rapid because of the speed at which the cam is revolving. When the flat surface A is reached, the bar 16 will be released thus permitting the springs 24 to rapidly elevate the bar 16 so as to position the same to begin the next stroke. In order to cushion the upward stroke of the bar 16, we provide a curved leaf spring 94 carried by the bracket arm 15 (Fig. 2) in the path of the bar 26, which engages said spring and thereby checks the return movement of the pusher bar.

The plunger 39 must be operated in time with the pusher bar 16, and the cam 21 is provided with three cam surfaces extending from D to E, E to F, and F to D. The surface from E to F has substantially the same radius, while from D to E, the surface is on an increasing radius, and from D to F the cam surface is on an increasing radius, but the curvature from D to E is less than from D to F, which produces a faster motion in the former case than in the latter.

When the cam 21 is operated in a clock-wise direction (Fig. 1) the slide bar 17 will be depressed, whereby the bell crank lever 43 will be swung to withdraw the plunger head 40 to the outer end of the trough 37. After the head 40 passes the chain 31, a nut will be dropped into the trough in the path of said head. As the cam travels from E to F on the roller 23, the bar 17 and the lever 43 will remain stationary, thus holding the head in its outward position and giving the chain 31 ample time to deposit a nut in the trough in the path of said head. As the cam travels from F to D the plunger 39 will be moved inwardly, whereby the head 40 will discharge the nut from the trough 37 into the opening 48.

The cams are so positioned on the shaft 18 as to act in harmony and consequently as the pusher bar 16 starts downward the plunger 39 begins its retracting movement and while the nut is being sawed, the plunger is at its stationary position. As the pusher bar is returned, the plunger is also returning to the position shown in Figure 3. It is obvious that the cams may be revolved at any rate of speed justified by the mechanism and the nut feeding elevator.

On the end of the shaft 18 (Figs. 2 and 3), we provide a crank handle 95 whereby the shaft 18 and the cams may be operated by hand when desired. This handle may be removed when not in use. In order to mechanically drive the shaft 18, a beveled pinion 96 is fastened thereon and meshes with a beveled pinion 97 secured on the upper end of an inclined countershaft 98. The countershaft is supported in a bracket 99 which also supports the outer end of the shaft 18. The lower end of the countershaft 98 is mounted in the bearing 100 carried in the top of a shield 101 (Figures 1, 7 and 8) which is mounted on the base 10. A beveled pinion 102 is fastened on the lower end of the shaft within the shield and meshes with a pinion 103 fastened on a drive sleeve 104.

The drive sleeve 104 is mounted at one end in a standard 105 (Figs. 7 and 8) and extends through a bearing box 106 on the upright of the shield 101. An enlarged clutch jaw 107 made integral with the sleeve bears against the end of the bearing so as to engage the clutch jaw 108 of a clutch member 109, as is shown in Figures 8 and 10. An elongated drive shaft 110 extends through the sleeve and beyond the standard 105. This drive shaft may be connected to the drive shaft of another machine (not shown), whereby more than one machine may be driven by the same source of power.

The clutch member 109 is slidable on the shaft 110 and said shaft is free to turn therein. A clutch head 113 is fastened upon the shaft 110 and V-shaped teeth 114 on the member 109 are adapted to engage in complementary seats 115 in the clutch head as is shown in Figures 8 and 10. The clutch jaws 107 and 108 remain in engagement constantly, but permit a sliding movement of the member 109, whereby the member may be clutched and unclutched.

For shifting the clutch member 109, a yoke 116 is pivoted at 117 on the reduced end of a curved cover plate 118, as is shown in Figures 9 and 10. The yoke carries trunnions 119 engaging in a groove 120. The yoke is provided with an upwardly extending lever 121, and by shifting this lever the yoke is swung on its pivots 117 and the clutch connected or disconnected. As is shown in Figures 1, 2, 7 and 19, a standard 122 is mounted adjacent the lever, and this standard has a bracket 123 at its top. The bracket carries a spring hook 124 which is shown in detail in Figure 19.

The upper end of the lever 121 is engaged in the hook and said hook is swung outward under the tension of its spring which is thus thrown off center. With the parts in this position the clutch will be engaged, and the teeth 114 will be positioned in the seats 115. So long as the parts remain in this relation, motion will be transmitted to the shaft 98, but should any part of the machine driven from the shaft 98 become obstructed so that a moving part is arrested the clutch will be disengaged, thus saving the machine from injury. When the machine is obstructed, the member 109 will be held against rotation, whereby its V-shaped teeth will ride out of the seats 115, and this action will slide the member 109 away from the head 113, which in turn will swing the lever 121 and trip the hook 124. When the hook moves sufficiently to swing its spring over its center, said spring will continue the movement of the hook and complete the swing of the lever 121.

Figure 7:
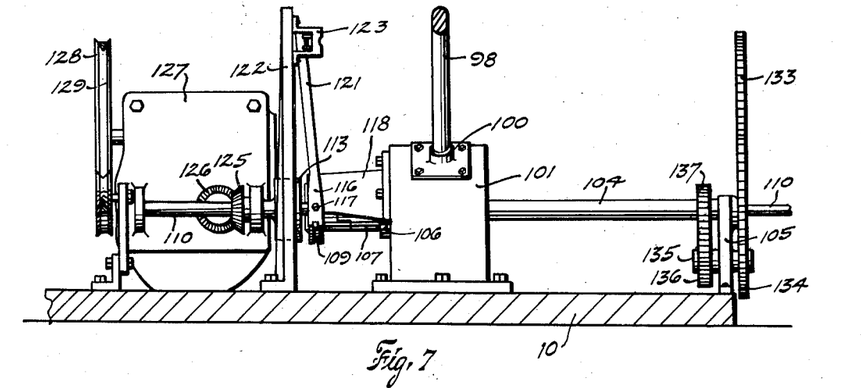
Figure 7 is a detail of the driving mechanism including the clutch.
Figures 8, 9, 10:
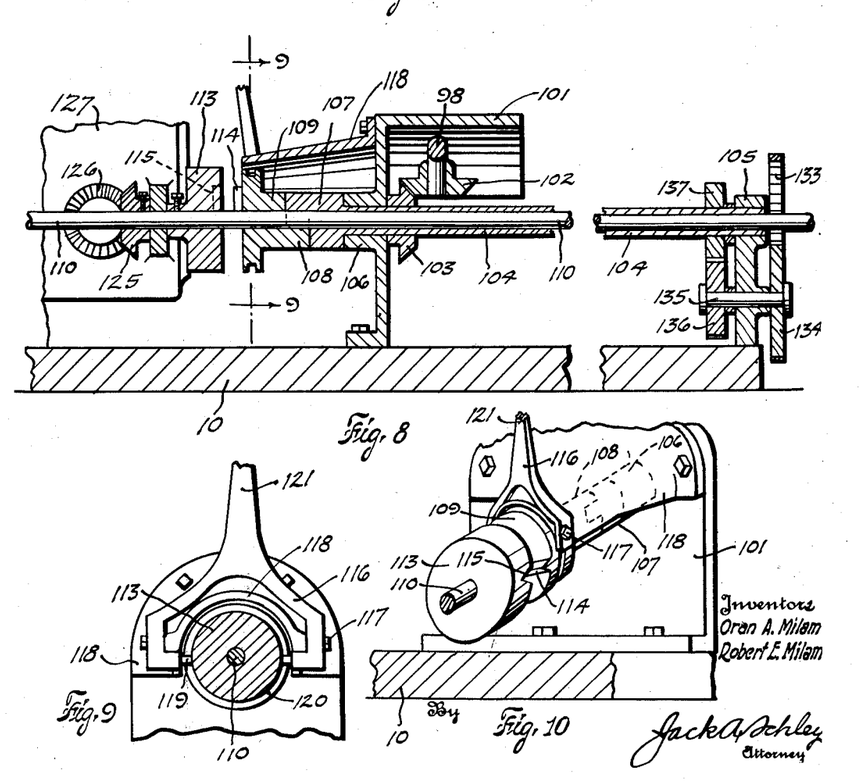
Figure 8 is a longitudinal vertical sectional view of the same.
Figure 9 is a transverse sectional view taken on the line 9—9 of Figure 8.
Figure 10 is a perspective view of the clutch.

It is obvious that the shaft 110 may be driven by any suitable means, and as an example we have shown a beveled gear 125 fastened on said shaft and driven by a beveled gear 126 (Figs. 2, 7 and 8). The gear 126 is suitably connected with a speed reducer 127 of suitable structure and forming no part of the invention. The speed reducer is connected with a pulley 128 which is driven by a belt 129 from a smaller pulley 130 as is shown in Fig. 2. The pulley 130 is mounted on the motor drive-shaft 62. For driving the elevator chain 31, a shaft 131 is connected with the bottom sprocket 32 (Figs. 2 and 13) and extends outwardly from the table 11. This shaft has a sprocket wheel 132 fastened on its outer end as is shown in Figures 1 and 2, which is driven by a sprocket chain 133. The sprocket chain is driven by a sprocket wheel 134 mounted on a countershaft 135, which is journaled in the standard 105 as is shown in Figures 2, 7 and 8. The shaft 135 is driven by a pinion 136 fastened thereon and meshing with a pinion 137 fastened on the drive sleeve 104. The drive for the elevator is so arranged as to move the chain 31 at the proper rate of speed to deposit the nuts in front of the plunger head 40 at the proper time.

In using the machine, the nuts to be sawed are deposited in the hopper 28 (Figs. 1, 2 and 3) from which they will flow into the chute 30. Motion being imparted to the various elements, the elevator chain 31 (Fig. 13) will be moved in the direction of the arrows, whereby each bucket 35 will pick up a single nut. In order to prevent the buckets from picking up more than one nut each, a guard 35' is mounted on the link in advance of each bucket link so as to overhang the bucket and thus dislodge a second nut should it catch on top of the nut held in the bucket. The nuts are intermittently dislodged from the elevator into the spout 36 so as to fall into the trough 37 (Fig. 3) in the path of the plunger head 40. When the nut is deposited in the trough 37 the elongated curved bottom 38 will tend to align the longitudinal axis of the nut (if it has such) with the longitudinal axis of said trough so that the nut will lie in proper position to be discharged.

At the time each nut is deposited in the trough 37, the plunger 39 will be retracted and the pusher bar 16 will be depressed for sawing the preceding nut. As the pusher bar begins its upward stroke, the plunger 39 begins its inward stroke, and when the head 50 passes above the path of the plunger head 40, the nut is discharged from the trough into the opening 48. The nut is received in the cage 55 (Figs. 3 and 6) and rests upon the shoulders b. Upon the down stroke of the pusher bar 16 and also upon the down stroke of the bar 17, which is effected by the cams 20 and 21, the pusher head 50 engages with the nut and the plunger 39 is retracted. The pusher head centers and straightens the nut and pushes it between the saws, whereby the shell is sawed in the manner hereinbefore described. The nut is discharged through the opening 54 into the chute 93, and the operation is continued as described.

It is pointed out that while we have described the machine for sawing nuts it may be used to saw fruit seeds or any other articles having the size and shape of nuts and capable of being sawed. While a pair of saws have been shown and described and referred to as being very thin and having fine teeth, it is obvious that it would be possible to omit one of the saws and make great variations in the size, thickness and number of teeth. The cage constitutes a self-adjusting support and by reason of the shoulders b supports the nuts above and out of contact with the saws. It is obvious that if the nuts were dropped directly on to the saws, said saws would begin cutting the nuts before they were centered and an unnecessary wearing contact would be brought about. The fly wheels 73 not only act to produce sufficient momentum to offset the shock due to the contact of the saws with the shells of the nuts, but also to maintain the rapid revolution of the saws during the sawing action so that the cutting will not drag.

We have found that the best results are obtained by revolving the saws at a very high rate of speed, and have run them at between 3000 and 4000 R. P. M. This is made possible by the gear arrangement and the fly wheels. However, we do not wish to be limited to such speed, and the saws may be revolved at any desirable rate of speed. The pusher bar 16 while reciprocated rapidly, is of course, worked at a much slower speed than the saws, but it has been found that very successful results may be had by operating the bars 16 and 17 at such a speed as to handle between 40 and 50 small nuts per minute. These figures are merely given as illustrations and the invention is in no way limited thereby as the speeds are subject to variation and much will depend upon the kind of nuts being handled. Considerable adjustment and variation is possible with the cams 20 and 21 and so long as the nut is discharged from the trough 37 into the path of the pusher bar at the proper time, the arrangement of the cams is secondary.

It is obvious that the gear box 53 should contain a suitable lubricant for the purpose of lubricating the gears 65 and 66. In order that the gears may revolve in an oil bath, we provide a box 53' for this purpose as is shown in Figures 3 and 17. It is pointed out that the trough 37 in which the head of the plunger 40 travels is open at both ends, and from this it will be apparent that if a nut should fall in front of the plunger head during its outer stroke, such a nut would be discharged from the open end of the trough and would thus not obstruct the operation of the machine. In Figure 20, we have shown a modified form of gauge ring 85'. This gauge ring is provided with an upper depression or recess 85a and a similar lower recess 85b. These depressions or irregularities below the perimeter of the ring, as shown in Figure 5, will permit the saws to cut to a greater depth, and therefore will more effectually saw the ends of the shells of the nuts which are thicker than the intermediate portions. It is obvious that the machine may be built with either form of gauge ring.

Various changes in the size and shape of the different parts, as well as modifications and alterations, may be made within the scope of the appended claims.

Having illustrated and described a preferred form of the invention, what we claim, is 1. In a nut sawing machine, a plurality of revolving circular saws, means for movably supporting said saws, a nut support for receiving a falling nut and supporting it above the saws and out of contact therewith, the support being yieldable laterally at its top and bottom for permitting the passage of nuts therethrough and for gripping nuts intermediate its ends, the support gripping each nut and being open to permit the saws to engage the nuts, and means for pushing the nuts through the support.

2. In a nut sawing machine, a support, rapidly moving saws mounted on the support, a yieldable nut cage mounted on the support and open for the entrance of the saws, said cage being arranged to support nuts out of contact with the saw, a vertical frame on the support, a vertical pusher bar mounted to reciprocate in the frame, a pusher head on the lower end of the pusher bar shaped to engage a nut and to enter the cage, and reciprocating means for feeding nuts into the path of the pusher head, the lower end of the cage being open and unobstructed to the free discharge of the sawed nuts therefrom.

3. In a nut sawing machine, a support, rapidly moving saws mounted on the support, a yieldable nut cage comprising upright members yieldable laterally at their upper and lower ends and mounted on the support and open for the entrance of the saws, said cage being arranged to support nuts out of contact with the saws, a vertical frame on the support, a pusher bar mounted to reciprocate in the frame, a pusher head on the lower end of the pusher bar shaped to engage a nut and to enter the cage, a nut receptacle, a plunger reciprocating horizontally in the receptacle for dislodging individual nuts into the path of the pusher head, and means for singly feeding nuts into the receptacle.

4. A nut sawing machine as set forth in claim 3, and means mounted on the frame for imparting reciprocation to the plunger.

5. As a sub-combination in a nut sawing machine, a nut supporting and gripping cage including an upper support and a lower support, upright arms yieldably carried by both supports for radial movement throughout their lengths, and revoluble circular saws extending into the cage between the arms.

6. As a sub-combination in a nut sawing machine, a nut supporting and gripping cage including an upper support and a lower support, upright grippers yieldably carried by said supports for radial movement, said grippers having their upper portions shaped to support a nut and their intermediate portions shaped to grip a nut, the lower portions of the grippers being bent outwardly to provide clearance for a nut discharged downwardly from the gripping portions.

7. In a nut sawing machine, a support, a cage having grippers mounted to yield radially, rapidly moving saws mounted to enter the cage between the grippers, means for feeding nuts to one end of the cage, the grippers having their upper portions constructed to support a nut above and out of contact with the saws, and means for pushing a nut through the cage and between the saws, the lower ends of the grippers being directed outwardly to provide an enlarged discharge opening for the sawed nuts.

8. In a nut sawing machine, a support, rapidly moving saws mounted on the support, a yieldable nut cage mounted on the support and open for the entrance of the saws, a frame on the support, a pusher bar mounted to reciprocate in the frame, a pusher head on the lower end of the pusher bar shaped to engage a nut and to enter the cage, a nut receptacle, a plunger reciprocating horizontally in the receptacle for dislodging individual nuts into the path of the pusher head, means mounted on the frame for imparting reciprocation to the plunger, a nut elevator for feeding nuts into the receptacle, means mounted on the frame for imparting reciprocation to the pusher bar, driving connections for the pusher bar and plunger operating means and also for the elevator, a common driving means for said driving connections including a clutch and means arranged to automatically disconnect said clutch.

9. In a nut sawing machine, a table having a nut opening, a gear housing mounted below the table and having a discharge chute, a yieldable nut cage mounted between the housing and the table, gears in the housing, shafts driven by the gears, swinging supports carried by the housing, saw spindles mounted in said supports, driving connections between the shafts and the saw spindles, circular saws mounted on the spindles and co-acting with the cage, a frame mounted on the table, a pusher bar mounted to reciprocate in the frame through the opening of the table, means on the frame for reciprocating the pusher bar, a trough mounted on the table adjacent the opening of said table, a plunger reciprocating horizontally in the trough to discharge nuts into the table opening and the cage, means for feeding nuts to the trough, a reciprocating bar mounted in the frame, means on the frame for reciprocating said bar, and a bell crank lever connected with said bar and the plunger.

10. In a nut sawing machine, a plurality of revolving circular saws, means for yieldably supporting said saws for engagement with a nut, a stationary support having yieldable members for receiving a nut and supporting it out of contact with the saws, means for feeding a nut axially thereof and longitudinally into the support, and a reciprocating element for pushing a nut held by the support between the saws and also discharging it from the saws, the lower ends of the nut supporting member being yieldable and unobstructed to a free discharge of the sawed nut by the reciprocating element.

11. In a nut sawing machine, a plurality of revolving circular saws, means for yieldably supporting said saws for engagement with a nut, a stationary support having yieldable members between the saws for receiving a nut and supporting it out of contact with the saws, means for feeding a nut axially thereof and longitudinally into the support, and a reciprocating element for pushing a nut held by the support between the saws and also discharging it from the saws and from the support.

12. In a nut sawing machine, a plurality of revolving circular saws, means for yieldably supporting said saws for engagement with a nut, a stationary support having yieldable members between the saws for receiving a nut and supporting it out of contact with the saws, means for feeding a nut axially thereof and longitudinally into the support, and a reciprocating element for pushing a nut held by the support between the saws and also discharging it from the saws, the stationary support having openings for the saws intermediate the ends of the yieldable members and the latter being unobstructed for free lateral movement.

13. In a nut sawing machine, a plurality of rvolving circular saws, means for yieldably supporting said saws for engagement with a nut, a stationary support having yieldable members between the saws for receiving a nut and supporting it out of contact with the saws in an upright position, means for feeding nuts into the support, a vertically reciprocating pusher bar for pushing a nut downwardly through the support between said saws, and means including elements constructed for imparting a fast downward movement to the pusher bar and so arranged as to impart a quicker return movement thereto.

14. In a nut sawing machine, a support, a saw spindle movably mounted on the support, means for driving the saw spindle, a pair of circular saws mounted on the spindle, in closely spaced relation, a narrow depth gage adjustably mounted on the support between the saws, the gage having an irregular surface provided with depressions for permitting the saws to cut deeper at the ends of a nut.

ORAN A. MILAM.
ROBERT E. MILAM.